(12) United States Patent
Foti

(10) Patent No.: US 6,785,246 B2
(45) Date of Patent: Aug. 31, 2004

(54) MULTI-PARTY CONFERENCING METHOD

(75) Inventor: George Foti, Dollard des Ormeaux (CA)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 760 days.

(21) Appl. No.: 09/757,737

(22) Filed: Jan. 9, 2001

(65) Prior Publication Data

US 2002/0089939 A1 Jul. 11, 2002

(51) Int. Cl.[7] .............................................. H04L 12/16
(52) U.S. Cl. ................................. 370/261; 379/202.01
(58) Field of Search ................................. 370/260, 261, 370/262, 263, 264, 266, 267, 352; 379/202.01, 204.01, 205.01, 207.01

(56) References Cited

U.S. PATENT DOCUMENTS

| | | | | |
|---|---|---|---|---|
| 5,673,080 A | * | 9/1997 | Biggs et al. | 348/14.09 |
| 6,157,401 A | * | 12/2000 | Wiryaman | 348/14.09 |
| 6,163,531 A | * | 12/2000 | Kumar | 370/260 |
| 6,646,997 B1 | * | 11/2003 | Baxley et al. | 370/260 |
| 6,657,975 B1 | * | 12/2003 | Baxley et al. | 370/260 |
| 6,687,234 B1 | * | 2/2004 | Shaffer et al. | 370/260 |
| 2002/0078153 A1 | * | 6/2002 | Chung et al. | 709/204 |
| 2002/0159394 A1 | * | 10/2002 | Decker et al. | 370/252 |

FOREIGN PATENT DOCUMENTS

| | | |
|---|---|---|
| EP | 0951168 A2 | 10/1999 |
| WO | WO 98/57485 | 12/1998 |

* cited by examiner

Primary Examiner—Chau Nguyen
Assistant Examiner—Brad Mace
(74) Attorney, Agent, or Firm—Smith, Danamraj & Youst, P.C.

(57) ABSTRACT

A system and method for setting up a multi-party conference call in a packet-switched radio telecommunications network in which a Gatekeeper (GK) has established an on-going two-party call between a first party and a second party. The first party sends an enhanced Facility message to the GK that indicates a multi-party conference call is desired, and includes a globally unique conference identity and a list of telephone numbers for third parties to be joined. A Multipoint Controller (MC) provides an Internet Protocol (IP) address of a Multipoint Processor (MP) to each of the parties, and provides the IP addresses of the parties to the MP. The MC then negotiates media sessions with each of the parties, and sends the negotiation results to the MP. Each of the parties then sends its media payload to the MP where the payloads are mixed and forwarded to the other parties.

12 Claims, 2 Drawing Sheets

MULTI-PARTY CONFERENCING METHOD

BACKGROUND OF THE INVENTION

1. Technical Field of the Invention

This invention relates to telecommunication systems and, more particularly, to a multi-party conferencing method in third generation (3G) packet-switched radio telecommunications networks.

2. Description of Related Art

In packet-switched radio telecommunications networks today that utilize the International Telecommunications Union (ITU) H.323 signaling protocol or the Internet Engineering Task Force (IETF) Session Initiation Protocol (SIP), a party cannot originate a multi-party conference call while engaged in an ongoing two-party call. Internet Protocol (IP) call-control protocols such as H.323 and/or SIP include an implicit assumption: the caller knows before establishing the call that he would like this call to be a multi-party call. By indicating during the initial call setup that the call is a multi-party call, the caller informs the entity receiving the call request (the H.323 gatekeeper or SIP server) to engage a Multipoint Control Unit (MCU) in the call from the beginning. The MCU includes a Multipoint Controller (MC) which controls the setup of multi-party conference calls, and a Multipoint Processor (MP) which performs the payload mixing and forwarding required for the conference calls. Thereafter, the MC can add additional parties to the call when requested. However, if two subscribers are engaged in a call that was originally set up as a two-party call, and they desire to conference-in a third party, they must hang up and begin the call again as a multi-party conference call.

This limitation on multi-party conference calls in packet-switched networks is not acceptable for mobile subscribers because it is more restrictive than the procedures available to subscribers in older circuit-switched networks. In circuit-switched networks, a third party can be added after the establishment of a two-party call by placing one party on hold, dialing a feature code and a third-party telephone number, and then connecting the third party. It would be desirable for mobile subscribers using 3G packet-switched networks to have the same capabilities as they have today with circuit-switched networks. The present invention provides a multi-party conferencing method in 3G packet-switched radio telecommunications networks that allows a multi-party conference call to be originated during an on-going two-party call.

SUMMARY OF THE INVENTION

In one aspect, the present invention is a multi-party conferencing method in a packet-switched radio telecommunications network in which a call-control server such as an H.323 Gatekeeper or SIP server has established an on-going two-party call between a first party and a second party. The call-control server first receives a message from the first party that includes an indication that a multi-party conference call is desired, and includes at least one telephone number of a third party to be joined in the multi-party conference call. The server then engages a Multipoint Control Unit (MCU) to set up the multi-party conference. A Multipoint Controller (MC) within the MCU provides an Internet Protocol (IP) address of an associated Multipoint Processor (MP) to the first, second, and third parties, and negotiates media sessions with each of the first, second, and third parties using H.245 procedures. The MP then receives media payload from each of the first, second, and third parties, mixes the media payload, and forwards the mixed payload from the MP to each of the first, second, and third parties.

In another aspect, the present invention is a system for joining a third party in a multi-party conference call in a packet-switched radio telecommunications network in which a call-control server has established an on-going two-party call between a first party and a second party. The system includes an MCU and a call-control server. The MCU includes an MP and an MC. The MP receives media payload from the first, second, and third parties, mixes the payload, and forwards the mixed payload to the first, second, and third parties. The MC sets up the multi-party conference call. The MC includes a control link to the MP for obtaining an IP address of the MP, and for providing an IP address of each of the first, second, and third parties to the MP. The MC also includes means for negotiating media sessions using H.245 procedures with each of the first, second, and third parties. The call-control server controls calls in the network and includes a signaling mechanism that communicates with the first, second, and third parties. The signaling mechanism receives a message from the first party that includes an indication that a multi-party conference call is desired and a telephone number of the third party. In response, the call-control server engages the MCU. The signaling mechanism also provides the IP address of the MP to the first, second, and third parties so that their media payload can be sent to the MP for mixing and forwarding.

In yet another aspect, the present invention is a combined Gatekeeper/Multipoint Control Unit (GK/MCU) for joining a third party in a multi-party conference call during an on-going two-party call between a first party and a second party. The GK/MCU includes a GK portion, an MC portion, and an MP portion. The GK portion includes a signaling mechanism that communicates with the first, second, and third parties. The signaling mechanism receives a message from the first party that includes an indication that a multi-party conference call is desired and a telephone number of the third party. In response, the GK portion engages the MC portion. The MC portion includes a control link to the MP portion and means for negotiating media sessions with each of the first, second, and third parties. The control link obtains the IP address of the MP portion which is then passed to the first, second, and third parties by the signaling mechanism in the GK portion. The control link also provides the IP address of each of the first, second, and third parties to the MP portion. Following H.245 negotiations by the MC portion, the MP portion receives media payload from the first, second, and third parties, mixes the payload, and forwards the mixed payload to the first, second, and third parties.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention provides an extension of the existing call-control protocols to remedy the shortcomings noted above. Although the description is made in terms of the H.323 protocol, the invention is also applicable to SIP. Therefore, the term "Gatekeeper" is used herein to refer to a call-control server which may be an H.323 Gatekeeper or a SIP server. The invention extends the signaling, and changes the sequence of events in order to enable multi-party conferencing after the establishment of an H.323 or SIP two-party call.

A basic assumption in the solution is that a subscriber can start a two-party call and convert it to a multi-party call anytime during the call. Under existing procedures, when a two-party call is set up, the role of the Gatekeeper is limited to establishing the call between the two parties using H.225 procedures. During the call setup procedure, the H.245 addresses of the two endpoints are exchanged, and thereafter, the two endpoints directly exchange information in an H.245 procedure for negotiating media sessions and exchanging their capabilities, etc.

Figure 1:
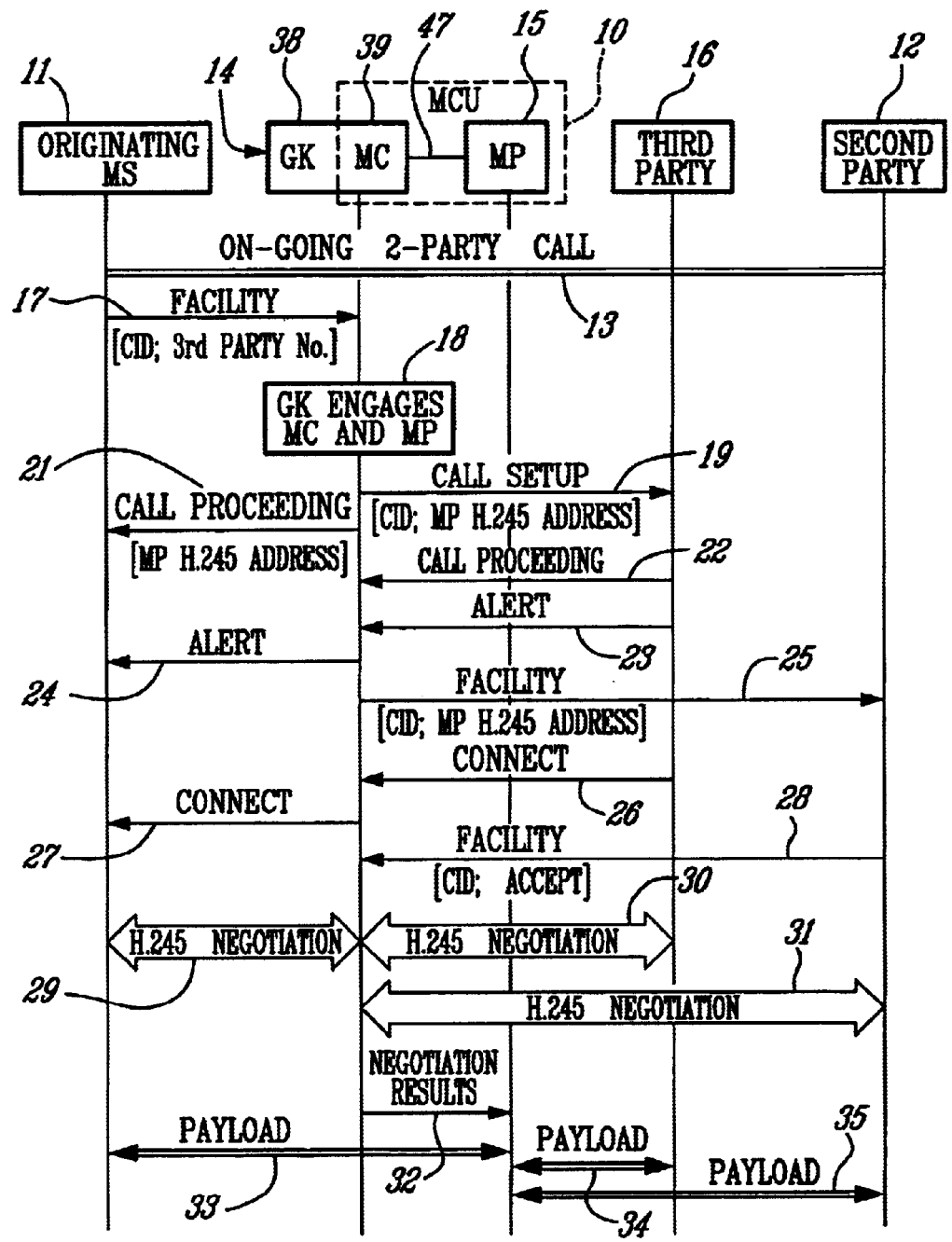
FIG. 1 is a signaling diagram that illustrates the steps of an exemplary embodiment of the method of the present invention.

FIG. 1 is a signaling diagram that illustrates the steps of an exemplary embodiment of the method of the present invention. An Originating MS 11 and a Second Party 12 are initially engaged in an on-going two-party call 13. The call was set up by a Gatekeeper (GK) 38 which may be co-located with a Multipoint Controller (MC) 39 in a combined GK/MC 14. The MC is normally under the control of the Gatekeeper. The MC communicates over an internal control link 47 with a Multipoint Processor (MP) 15 to form a Multipoint Control Unit (MCU) 10 in a process known to those skilled in the art. The MP performs payload mixing during multi-party conference calls while the MC controls the conferencing process.

At some later point in time, the Originating MS 11 decides to add a Third Party 16 to the call. The Originating MS then issues a Facility message 17 to the GK/MC 14. In the Facility message, the MS indicates that a multi-party conference is desired by including a globally unique Conference Identity (CID) and the telephone number of one or more Third Parties. The Facility message is a generic H.323 message that allows a number of actions to be performed. Some actions are currently defined in the ITU standards for the message, but the generic nature of the message allows additional actions to be performed. In the present invention, the Originating MS generates the Facility message and includes in the message the globally unique CID and a list of numbers for parties to be added to the call. The Facility message also includes a field called the Facility Information Element. The Facility Information Element defines the purpose of the Facility message. In the present invention, the Facility Information Element is extended to indicate that a multi-party conference call is to be set up.

The Gatekeeper 38 understands the new extensions in the Facility message and engages the MC 39 in the call at step 18. The MC, in turn, engages the MP 15 and obtains the H.245 (IP) address of the MP 15. In order to set up the multi-party conference call, the GK/MC 14 identifies the IP addresses to be used by each party, and informs each party of the H.245 address of the MP. This is the IP address where each party will send its media payload. All endpoints in the multi-party conference then perform existing H.245 procedures with the GK/MC 14. The GK/MC passes the negotiation results to the MP 15 so that the MP can do the necessary voice conversion (coding/de-coding), mixing of voice, adding more parties to the call, and so on. All of the parties then send their payload to the MP so that the MP can do the payload mixing.

At step 19, the GK/MC 14 attempts to set up a call leg to the Third Party 16 by sending a Call Setup message which includes the H.245 address of the MP 15, and the CID of the conference to indicate that this is a multi-party call. The GK/MC also returns a Call Proceeding message 21 to the Originating MS 11 that also includes an additional parameter, namely the H.245 address of the MP. Call setup with the Third Party continues to proceed as a normal call, with the Third Party returning a Call Proceeding message 22 and an Alert message 23 to the GK/MC. The GK/MC sends an Alert message 24 to the Originating MS while also passing the CID and the H.245 address of the MP to the Second Party 12 in a Facility message 25. In this way, the Second Party is notified that the call has been switched from a two-party call to a multi-party call, and is provided with the new H.245 address for the media (payload). The Third Party may then send a Connect message 26 to the GK/MC, which is forwarded to the Originating MS at 27.

At step 28, the Second Party returns a Facility message to the GK/MC 14 and includes the CID and an indication that the multi-party conference is accepted. At steps 29–31, H.245 negotiations are conducted between the MC and the endpoints in order to exchange parameters and capabilities between each of the parties, and set up the media sessions. The H.245 negotiations, which are defined in the H.323 standard, result in the creation of logical control channels between the GK/MC and each party to the conference, and enable the exchange of endpoint capabilities. Following the negotiations, the negotiation results are passed to the MP at step 32 so that the MP can set itself up accordingly. Media payloads from each party are then connected through the MP 15 which performs the payload mixing and forwarding at steps 33–35.

Figure 2:
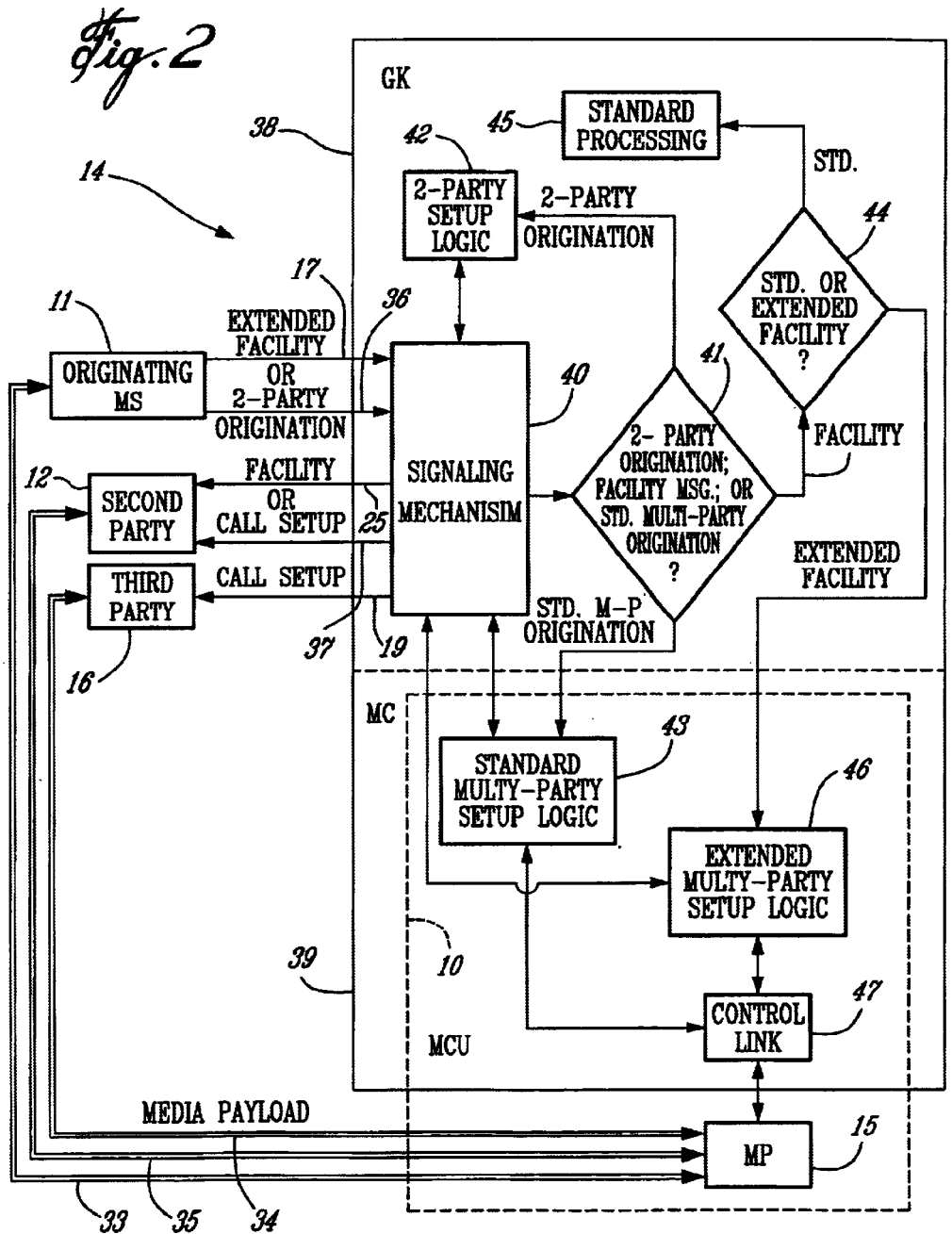
FIG. 2 is a simplified block diagram of an exemplary embodiment of a Gatekeeper/Multipoint Control Unit (GK/MCU) in the system of the present invention.

FIG. 2 is a simplified block diagram of an exemplary embodiment of a combined GK/MC 14 in the system of the present invention. The node is functionally divided into a GK portion 38, an MC portion 39, and an MP portion 15. A signaling mechanism 40 communicates with the Originating MS 11, the Second Party 12, and the Third Party 16. If the Originating MS is originating a two-party call, a two-party origination message 36 is sent to the GK portion. If the Originating MS is originating a multi-party call, a multi-party Call Setup message as per existing standards (not shown) is sent to the GK portion. If the Originating MS is adding additional parties to an ongoing two-party call, an extended Facility message 17 is sent to the GK portion. The extended Facility message contains the CID and the telephone number of the Third Party 16. Of course, the GK portion may also receive a standard Facility message which receives standard processing.

The signaling mechanism passes the received message to block 41 where the GK portion 38 determines whether a two-party origination message, a Facility message, or a standard multi-party origination message was received. If a two-party origination message was received, the GK portion uses two-party call-setup logic 42, and the signaling mechanism sends a Call Setup message 37 to the second party to set up the call as normal. If a standard multi-party origination message was received, the GK portion engages the MC portion 39, and standard multi-party call-setup logic 43 is used to set up the conference call.

If it is determined at 41 that a Facility message was received, it is then determined at 44 whether the Facility message was a standard Facility message or an extended Facility message. If a standard Facility message was received, the GK portion 38 uses standard processing at 45 in response to the message. If an extended Facility message was received from the Originating MS, the Facility Information Element and the presence of the CID indicates that the call is a multi-party conference call requiring different processing than the normal processing as per the current standard. Therefore, the GK portion engages the MC portion 39, and extended multi-party call-setup logic 46 is used to set up the conference call. The signaling mechanism 40 is used to send the Facility message 25 and the Call Setup message 19 to the Second Party 12 and the Third Party 16, respectively. Control link 47 is used to obtain an IP address for the MP 15 which is passed to the Second Party and Third Party along with the CID.

The combination of the standard multi-party setup logic 43, the extended multi-party setup logic 46, the control link 47, and the MP 15 form the MCU 10. After each party conducts H.245 negotiations with the GK/MC, the control link is also used to pass the negotiation results and other control information to the MP so that it can properly receive, mix, and forward the media payloads 33–35 from each of the parties involved in the call.

It is thus believed that the operation and construction of the present invention will be apparent from the foregoing description. While the method, apparatus and system shown and described has been characterized as being preferred, it will be readily apparent that various changes and modifications could be made therein without departing from the scope of the invention as defined in the following claims.

What is claimed is:

1. A multi-party conferencing method in a packet-switched radio telecommunications network in which a call-control server has established an on-going two-party call between a first party and a second party, said method comprising the steps of:
   receiving by the call-control server, a message from the first party, said message including:
      an indication that a multi-party conference call is desired, and
      at least one telephone number of a third party to be joined in the multi-party conference call;
   engaging by the call-control server, a Multipoint Control Unit (MCU) to set up the multi-party conference, said MCU including a Multipoint Controller (MC) for controlling setup of the multi-party conference, and a Multipoint Processor (MP) for mixing and forwarding media payload for the parties;
   providing by the MC, an Internet Protocol (IP) address of the MP to the first, second, and third parties;
   negotiating by the MC, media sessions with each of the first, second, and third parties;
   receiving in the MP, media payload from each of the first, second, and third parties;
   mixing the media payload in the MP; and
   forwarding the mixed payload from the MP to each of the first, second, and third parties.

2. The multi-party conferencing method of claim 1 wherein the call-control server is an H.323 Gatekeeper, and the message from the first party is an H.323 Facility message that includes a globally unique conference identity (CID).

3. The multi-party conferencing method of claim 2 wherein the indication that a multi-party conference call is desired is a Facility Information Element that is modified to indicate that a multi-party conference call is to be set up.

4. The multi-party conferencing method of claim 2 wherein the step of providing by the MC, an IP address of an MP to the first, second, and third parties includes sending a second Facility message from the MC to the second party, said second Facility message including the globally unique CID and the IP address of the MP.

5. The multi-party conferencing method of claim 4 further comprising sending a third Facility message from the second party to the MC in response to the second Facility message, said third Facility message including the globally unique CID and an indication that the multi-party conference is accepted.

6. The multi-party conferencing method of claim 2 wherein the step of providing by the MC, an IP address of an MP to the first, second, and third parties includes the steps of:
   sending a Call Setup message from the MC to the third party, said Call Setup message including the globally unique CID and the IP address of the MP;
   receiving a response from the third party accepting the call;
   sending a Call Proceeding message from the MC to the first party, said Call Proceeding message including the IP address of the MP;
   sending a second Facility message from the MC to the second party, said second Facility message including the globally unique CID and the IP address of the MP; and
   sending a third Facility message from the second party to the MC, said third Facility message including the globally unique CID and an indication that the multi-party conference is accepted.

7. The multi-party conferencing method of claim 1 further comprising, after the step of negotiating media sessions with each of the first, second, and third parties, the step of sending negotiation results from the MC to the MP.

8. The multi-party conferencing method of claim 1 wherein the call-control server is a Session Initiation Protocol (SIP) server.

9. A multi-party conferencing method in a packet-switched radio telecommunications network in which a call-control server has established an on-going call between a first party and a second party, said method comprising the steps of:
   receiving by the call-control server, a message from the first party that includes an indication that a multi-party conference is desired, and that identifies a third party to be joined in a multi-party conference call;
   providing by the call-control server, an Internet Protocol (IP) address of a Multipoint Processor (MP) to the first, second, and third parties;
   providing by the call-control server, an IP address of each of the first, second, and third parties to the MP;
   receiving in the MP, media payload from each of the first, second, and third parties; and
   mixing and forwarding media payload in the MP from each of the first, second, and third parties to establish a multi-party conference call.

10. A system for joining a third party in a multi-party conference call in a packet-switched radio telecommunications network in which a call-control server has established an on-going two-party call between a first party and a second party, said system comprising:
   a Multipoint Control Unit (MCU) comprising:
      a Multipoint Processor (MP) for receiving media payload from the first, second, and third parties, mixing the payload, and forwarding the mixed payload to the first, second, and third parties; and
      a Multipoint Controller (MC) for setting up the multi-party conference call, said MC comprising:
         a control link to the MP for obtaining an Internet Protocol (IP) address of the MP, and providing an IP address of each of the first, second, and third parties to the MP; and means for negotiating media sessions with each of the first, second, and third parties; and a call-control server for controlling calls in the network, said call-control server comprising:

a signaling mechanism that communicates with the first, second, and third parties, said mechanism receiving a message from the first party that includes an indication that a multi-party conference call is desired and a telephone number of the third party, and providing the IP address of the MP to the first, second, and third parties; and means for engaging the MCU in response to the message from the first party.

11. The system for joining a third party in a multi-party conference call of claim 10 wherein a plurality of third parties are being joined, and the signaling mechanism includes signaling means for receiving a message from the first party that includes an indication that a multi-party conference call is desired and a list of telephone numbers of the third parties to be joined.

12. In a packet-switched radio telecommunications network, a combined Gatekeeper/Multipoint Control Unit (GK/MCU) for joining a third party in a multi-party conference call during an on-going two-party call between a first party and a second party, said GK/MCU comprising:

a Gatekeeper portion comprising:

a signaling mechanism that communicates with the first, second, and third parties, said mechanism receiving a message from the first party that includes an indication that a multi-party conference call is desired and a telephone number of the third party, and providing an Internet Protocol (IP) address of a Multipoint Processor (MP) portion to the first, second, and third parties;

an MP portion for receiving media payload from the first, second, and third parties, mixing the payload, and forwarding the mixed payload to the first, second, and third parties; and an MC portion for controlling the setup of the multi-party conference call, said MC portion comprising:

a control link to the MP portion for obtaining the IP address of the MP portion, and providing an IP address of each of the first, second, and third parties to the MP portion; and means for negotiating media sessions with each of the first, second, and third parties.

* * * * *